United States Patent [19]

Bitterly

[11] 4,389,794
[45] Jun. 28, 1983

[54] VACUUM CHAMBER AND METHOD OF CREATING A VACUUM

[76] Inventor: Jack G. Bitterly, 4723 Vista De Oro Ave., Woodland Hills, Calif. 91367

[21] Appl. No.: 220,004

[22] Filed: Dec. 23, 1980

[51] Int. Cl.$^3$ .................. F26B 5/06; A23G 9/00; F01B 31/00; F27B 5/04
[52] U.S. Cl. .................................. 34/5; 34/92; 62/303; 62/343; 92/110; 432/205
[58] Field of Search .............. 34/5, 92; 99/492; 432/205; 62/303, 343; 165/91, 94; 92/5 R, 110

[56] References Cited

U.S. PATENT DOCUMENTS

| | | | |
|---|---|---|---|
| 1,318,464 | 10/1919 | Schwizer | 264/215 |
| 2,547,393 | 4/1951 | Huzenlaub et al. | 34/140 |
| 2,616,604 | 11/1952 | Folsom | 34/15 X |
| 3,309,779 | 3/1967 | Ginnette et al. | 34/5 |
| 3,390,580 | 7/1968 | Taylor | 73/864.34 |

Primary Examiner—John J. Camby
Attorney, Agent, or Firm—Koppel & Harris

[57] ABSTRACT

The vacuum chamber includes an airtight generally cylindrical wall and a pair of end members. Vacuum pumps in the chamber evacuate the chamber. The chamber is rotated along the longitudinal axis whereby the centrifugal force of the rotating cylindrical wall acts against the force resulting from the pressure differential between the inside of the evaluated chamber and ambient pressure on the outside of the cylindrical wall to prevent the cylindrical wall from collapsing. An inner member is mounted in the chamber, but the chamber rotates with respect to the inner member. In a low temperature embodiment for freeze drying refrigerated air cools the outside of the chamber to reduce the temperature within the chamber. The consensables condense on the inside of the cold cylindrical wall. A lathe adjacent the inside of the cylindrical wall and lathe drive means for moving the lathe along the length of the cylindrical wall as the wall passes thereover upon rotation of the chamber for removing excess ice from the inside of the cylindrical wall. A higher temperature embodiment for hydrocarbon pyrolysis is also disclosed. Shale is fed into bins, is heated, and vapors condense on the chamber wall where they form a liquid from which is pumped through the chamber by centrifugal force of the rotating chamber.

34 Claims, 13 Drawing Figures

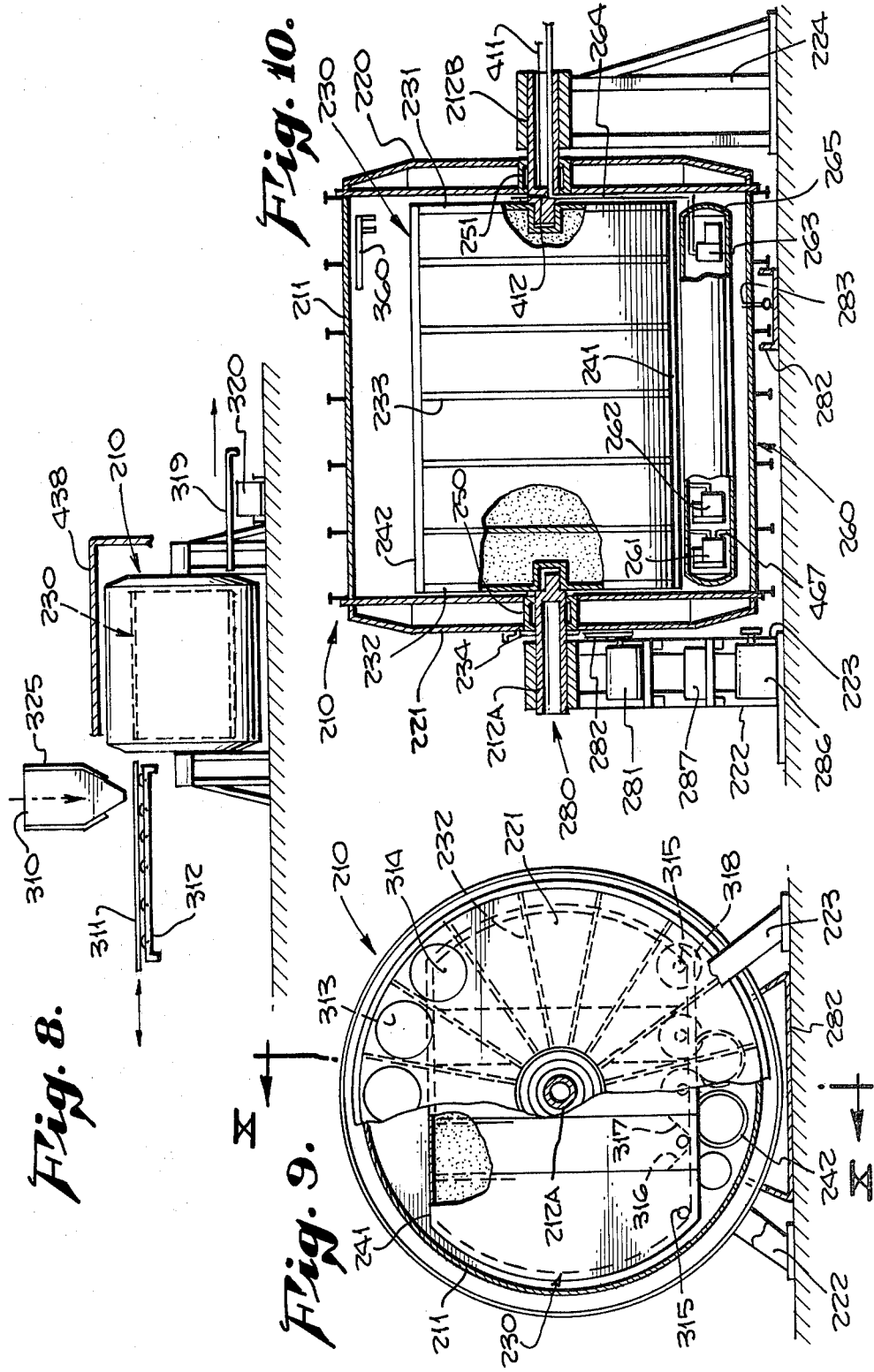

VACUUM CHAMBER AND METHOD OF CREATING A VACUUM

BACKGROUND OF THE INVENTION

This invention relates to a large vacuum chamber system, a new method for creating a vacuum in a large volume, systems utilizing the chamber and method for vacuum food processing and pyrolysis of hydrocarbon containing material.

Many processes and procedures need a vacuum to produce desired results. Other processes would benefit if carried out in vacuum. In freeze-drying of food, for example, a vacuum is used to lower the boiling point of the water in the food so that it can be removed from the food at low temperature. The freeze-drying of most foods, such as coffee, can be accomplished in a relatively short time so that a relatively small chamber may be sufficient for vacuum processing of all of a company's production. Where the vacuum processing takes longer, the total volume for vacuum processing must be increased to accommodate the extra material held in the processing system.

Other processes involving gas flows are pressure dependent. For example, the pyrolysis of hydrocarbon containing material such as oil shale or tar sands can be enhanced by reduced pressure. In the standard above-ground retort shale or tar sand is heated to a pyrolysis temperature thermally cracking the hydrocarbons. Some fractions such as methane are released as uncondensible vapor, and those that form condensates ultimately end up as petroleum products.

The vapor that is created must be removed rapidly. Because of the surrounding cloud of hydrocarbon vapors, each having its own partial pressure, it is more difficult for molecules to escape from the rock or other material being pyrolyzed because the molecules that are attempting to escape collide with reverse flux molecules in the surrounding cloud, and at ambient pressure, most molecules reflect back toward the source material. This slows the process rate so that for a given retort having a certain capital cost, the amount of material that can be processed in a given time decreases. If the hydrocarbon molecules could be removed from the material at molecular speeds up to thousands of feet per second rather than the mass transfer speeds of inches or a few feet per second, the process may be dramatically speeded up. In a vacuum, molecules travel at their molecular speeds because they seldom collide with neighboring molecules. This speed is a function of the system temperature and in an inverse relationship to the pressure.

For economical pyrolysis, large scale systems are believed necessary. If the amount of material processed by a system increases without a corresponding increase in capital costs, the material produced by the latter system will cost less because it has a smaller capital cost factor. Vacuum systems, however, have inherently been limited in size for reasons set forth more fully below. If a large vacuum retort can be built, pyrolysis costs could be reduced depending on the process's sensitivity to pressure and the capital costs associated with implementing the vacuum.

It will be recognized that large vacuum chambers have other uses. Some of the largest vacuum chambers in existence today were developed in conjunction with the aerospace program so that space vehicles could be tested to simulate the vacuum that exists above the atmosphere. For example, the early manned space vehicles were tested in the large vacuum chambers to determine if they leak and to ascertain heat transfer at low pressure. Manned space vehicles such as the space shuttle are orders of magnitude bigger than the earlier space probes such as Gemini and Apollo, but there have been no large vacuum chambers built to accomodate the current larger vehicles. One of the larges known vacuum tanks in the United States is 40 feet (12.1 m) in diameter built at very great cost by NASA.

As size increases, the total force acting on the walls of the chamber increases so the wall thickness must increase disproportionately with volume. Therefore, the main limitation on the size of vacuum chambers is the wall thickness necessary to sustain the collapsing forces.

The pressure acting on the outside wall of the chamber is a function of the following equation:

$$p \cong 0.807 \frac{Et^2}{lr} \left\{ \left( \frac{1}{1-(.3)^2} \right) \frac{l^2}{r^2} \right\}^{\frac{1}{4}} \tag{1}$$

Where p=pressure differential between the inside and the outside of the chamber wall (psi);
E=modulus of elasticity=$3.0 \times 10^7$ psi (stainless steel);
t=wall thickness (in);
l=length of unsupported cylinder (in); and
r=tank radius (in).

With Equation (1), the pressure differential that a chamber can withstand may be calculated based on varying chamber radius and wall thickness. Although the theoretical pressure differential between the inside of the chamber at full vacuum and the outside will be 14.7 psi (7.1 g/sq. cm), a safety factor for the metal chamber wall must be considered. Assume that a tank is 15 ft (4.6 m) in diameter and has a 8 ft (2.4 m) length. If the wall thickness (t) is 0.5 in (12.7 mm) the tank will withstand a pressure differential of approximately 53.5 psi. Based on the 14.7 psi pressure differential that will be encountered, this is a safety factor of approximately 3.6 which is considered sufficient.

If the diameter of the tank is very much greater, say 60 ft (18.3 m) with a length of approximately 40 ft (12.2 m), the conditions radically change. Under equation (1) the same tank thickness of 0.5 in can withstand a pressure differential of only 1.34 psi. To withstand a pressure differential of 14.7 psi, the wall thickness would have to be increased to between 1 and 1.5 in, but that would yield no safety factor. To yield an effective pressure differential with the same safety factor of 3.6, the wall thickness would have to be approximately 2.25 in (5.72 cm). Such a tank made of stainless steel would weigh more than 360 tons (327 metric tons) without any supporting structure.

The fabrication of such a structure would also be extremely costly and impractical. Because of the size and weight of the tank, it must be built on site, and the fabrication equipment would have to be used at the site. The forming or welding of more than 2 inch thick plates of stainless steel into a cylindrical perfectly sealed tank on site is a most formidable task. It would be advantageous, therefore, to be able to build a vacuum chamber with very much thinner walls. As a comparison, a 10 ft×10 ft×3 in plate of stainless steel weighs up to 6 tons (5450 kg), but a ⅛ in thick plate of the same area weighs only about 500 lb (227 kg). Even though the large tank would still be built on site, it is relatively easy with today's technology to form and weld ⅛ in plate. A 60 ft in diameter tank of 40 ft length having a wall thickness of ⅛ in (3.2 mm) would weigh approximately 20 tons (18 metric tons) versus the 360 tons (327 metric tons) of the same tank with 2.25 in (50.4 mm) thick walls. The raw materials alone for the tank having the thicker walls cost about 18 times more than the thinner wall version for the same volume, and the fabrication costs would be more than 18 times greater for existing standard designs.

One of the objects, therefore, of the present invention is to disclose and provide a novel vacuum chamber which can use substantially thinner walls than was heretofore thought possible. Such a tank will substantially decrease the cost of manufacturing large vacuum chambers and allow processes not previously undertaken to be made feasible.

Another problem in vacuum processing is that the vacuum pumps must do more than merely remove the initial air in the chamber. As the pressure decreases, the material within the chamber evaporates or sublimes yielding molecules that must be removed from the chamber. The lower the internal pressure of the chamber that is sought, the greater the amount of the evaporating volumetric contents that must be removed. If the process requires near vacuum in the range of less than 0.5 in (11 mm) Hg, large amounts of energy must be expended to maintain the vacuum, and the cost of such energy may make an otherwise beneficial process uneconomical.

Another significant problem is that it is not desirable to pass the evacuants that contain condensables through the vacuum pumps. Doing so tends to make the pumps very much more inefficient because of condensation within the pump. The condensate also tends to damage the pump. As a result, elaborate systems have been developed to condense the condensables between the pumps and the chamber. These systems are quite costly, and they necessitate having double condensing equipment. When one condenser is filled with frozen condensate, the duplicate system must be used while the first system is defrosted. The condenser must be warmed for defrosting, and additional energy is necessary to cool the condenser again from its elevated temperature. This is inefficient and wasteful of energy.

Another problem with large vacuum chambers is the necessarily large conduits necessary to connect the vacuum pumps with the chamber. They must be of wide diameter to minimize the pressure drop between the pump and the chamber. The condensation problem, the necessary large diameter tubing and the duplication required substantially increases the cost of large vacuum processing systems such that it may be uneconomical to use an otherwise beneficial vacuum processing system.

The present system overcomes those problems dramatically.

Although some of the aforesaid problems are alleviated in the higher temperature environment of pyrolysis, others are created. In pyrolysis of shale and tar sands, the source material is reduced to a relatively small particle size through crushing or some other mechanical method or by explosions. By decreasing the particle size, the surface area increases and the reaction generally speeds up. The particle size should be an optimum of processing size for process time versus crushing and processing costs. If the particle size is too small, however, powder-like fines are created that impede processing by tending to contaminate the liquid condensate and vapor making the process substantially more difficult and contaminating the end product.

In combustion processes the heat for pyrolysis is obtained through combustion of some of the shale itself. The products of combustion tend to contaminate the end products. Whether the pyrolysis takes place in large, above ground retorts or in situ, because the rock is not of uniform size or hydrocarbon content, there is channeling and charring, which causes incomplete combustion and leads to further contamination of the desired hydrocarbons. Also, incomplete pyrolysis wastes shale. Both from a cost standpoint and a conservation viewpoint, it is advantageous to obtain all desired hydrocarbons from all processed ore such that the spent shale is environmentally innocuous.

Another potential problem in pyrolysis is that if the vapors are exposed to the atmosphere, they can become explosive and toxic. This problem has been solved at high cost in a number of different ways, but if processing occurs in a vacuum, no oxygen will support an explosion. Such a system can be a closed cycle, and all subsystems can be fully controlled.

As will be set forth more fully hereinafter, the process described is a closed cycle batch process. As with most batch processes, starting and stopping the cycle creates inefficiencies. The present invention overcomes many of these problems by rather unique solutions, and it is an object to disclose and provide an invention that eliminates many of the problems associated with a batch process. For example, most batch systems are energy inefficient because heat of process is lost and is not readily transferable to the next batch cycle. The present invention overcomes many of these problems.

Another problem may result in the use of processing time to raise the ore to pyrolysis temperatures. One object of the present invention is to save the heat from a batch that has been processed to use it on forthcoming batches. Another object of the present invention is to disclose and provide a system for loading and unloading a retort as quickly as possible so that time between batches is minimized. Another object of the present invention is to disclose and provide a system that minimizes the need for external condensers. Normally, it is desirable to maintain the majority of the hydrocarbons in the gaseous or vapor state until they reach the condenser because liquid shale oil or petroleum from tar sands is very heavy, viscous oil that tends to clog retort structure and to slow processing. One of the objects, therefore, of the present invention is to eliminate this necessity of maintaining the vapors at a high temperature until they reach the condenser. As will be discussed hereinafter, one of the advantages of the present invention is that the liquid phase can be reached efficiently within the chamber to the advantage of the system. One of the other objects of the present invention is that some of the heat of condensation can be utilized in preheating incoming ore. One of the other objects of the present invention is to provide structure that eliminates or removes the particulate matter that would have contaminated the liquid phase without additional equipment.

SUMMARY OF THE INVENTION

Vacuum Tank

The present invention relies on rotating the chamber along its longitudinal axis at a relatively high rate of speed such that the centrifugal force acting on the walls can be balanced against the pressure differential forces tending to collapse the chamber. The use of this concept produces many surprising results in the present environments.

The first surprising result produced is that the shell can be made very much thinner than it would have to be without rotation. The necessary thickness is calculated as follows.

$$p = GW \tag{2}$$

Where
p = outside ambient pressure (psi);
G = number of rotational gravities over one; and
W = weight per unit area of wall (psi).

$$W = wt \tag{3}$$

Where
w = density of the rotating material (lbs/in$^3$); and
t = wall thickness (in).
By substituting (3) into (2), $$p = Gwt \tag{4}$$

$$G = KDN^2 \tag{5}$$

Where
K = a constant of proper units;
D = tank diameter (in), and
N = tank rotational speeds (rpm).

If (5) is substituted into (4) and the equation is solved for the rotational speed:

$$N = (p/KDtw)^{\frac{1}{2}} \tag{6}$$

It is next necessary to find the rotational speed necessary so that the pressure differential between sides of the tank wall will be zero, i.e. the centrifugal forces exactly equal the external pressure so that there will be no stress on the wall due to internal vacuum.

Assume that the tank has a 60 ft diameter which is substantially larger than the largest tanks currently in existence. The surface speed (v) of the tank wall is representated by the following equation:

$$v = \pi DN/12(60) \tag{7}$$

The surface speed v should be very much less than 0.3 Mach (335 ft/sec) in order to minimize outside surface air drag effects. Thickness t should be small in equation (6) to reduce the rotational speed and the structural costs, but a small t results in a large rotational speed which is undesirable. Therefore, the weight of the material must be made as large as possible. The weight of 304 stainless steel, the preferred material for a vacuum tank for a given thickness is fixed, however, with a density of approximately 0.296 lbs/in$^3$. In order to increase w in equation (6) without increasing the thickness of the wall, the invention contemplates the use of a ballast lying against the inside tank walls. The ballast need not be airtight; the stainless steel walls will prevent leakage. The ballast functions to transfer its centrifugal force to the inside of the walls to add a force against the pressure differential forces acting from the outside of the tank.

Now that it is determined that a non-structural ballast can be used to substitute for a very much thicker stainless steel wall, what is even more surprising is that the ideal ballast is ice or other condensate forming on the inside of the wall. Of course, lead or other high density metal could be used as ballast, but with ice, the system creates its own ballast of 0.036 lbs/cu. in. density during operation. As will be discussed in greater detail hereinafter, when the tank is used for food processing, ice forms at a desirable rate—quickly at first. When the water content of the food is still great, it can be drawn off at moderate to low vacuum to form ice quickly and thus build the necessary ballast so that there will be sufficient ballast when higher vacuum is used.

Equation (6) is modified to include a ballast term so that it becomes:

$$N = \left( \frac{p}{KD(tw + t_1 w_1)} \right)^{\frac{1}{2}} \tag{8}$$

Where
$t_1$ = the ballast thickness (in); and
$w_1$ = ballast density (lb/in$^3$).

Equation (8) can be solved for various values of t (the wall thickness) and (the speed of the shell).

Table 1 shows the relationship between $t_1$ and t both in inches at various surface speeds and the values are graphed in FIG. 6 a minus (−) value indicates no ballast is required at the noted thickness and speed.

TABLE 1

| t(in)    | $\frac{1}{8}$ | $\frac{1}{4}$ | $\frac{1}{2}$ | $\frac{3}{4}$ | 1     |
|----------|---------------|---------------|---------------|---------------|-------|
| N(ft/sec)| $t_1$         | $t_1$         | $t_1$         | $t_1$         | $t_1$ |
| 22.3     | 786           | 785           | 783           | 781           | 779   |
| 44.7     | 196           | 194           | 192           | 191           | 189   |
| 67.0     | 86.5          | 85.4          | 83.4          | 81.4          | 79.3  |
| 89.4     | 48.2          | 47.2          | 45.1          | 43.1          | 41.0  |
| 111.7    | 30.5          | 29.4          | 27.4          | 25.4          | 23.3  |
| 134.0    | 20.9          | 19.8          | 17.8          | 15.7          | 13.7  |
| 156.4    | 15.0          | 14.0          | 12.0          | 9.8           | 7.8   |
| 179.0    | 11.3          | 10.3          | 8.2           | 6.1           | 4.1   |
| 201.0    | 8.7           | 7.7           | 5.6           | 3.6           | 1.5   |
| 223.4    | 6.9           | 5.8           | 3.8           | 1.7           | (−)   |
| 245.7    | 5.5           | 4.5           | 2.4           | 0.4           | (−)   |
| 268.0    | 4.4           | 3.4           | 1.4           | (−)           | (−)   |
| 290.4    | 3.6           | 2.6           | 0.6           | (−)           | (−)   |
| 312.7    | 2.9           | 2.0           | (−)           | (−)           | (−)   |
| 335.1    | 2.5           | 1.5           | (−)           | (−)           | (−)   |

Thus, a 60 ft. diameter chamber having a wall thickness of $\frac{1}{8}$ in (2.8 mm) rotating at 106 rpm with a surface speed of 335 ft/sec would need about 2.5 in (64 mm) of ice as a ballast in order to prevent any collapsing force at full vacuum. At a slower speed of 223 ft/sec, the chamber having the same wall thickness requires almost 7 in (178 mm) of ice, and at 112 ft/sec, the same chamber would require more than 30 in (0.76 m) of ice as a ballast. The equations used presume that the entire center of gravity of the ice is concentrated at the cylindrical wall. As the thickness increases, however, the average thickness moves away from the wall to decrease the centrifugal force. Therefore, when the equation yields relatively thick ice, either additional ice thickness will be necessary, or the speed will have to be increased in order to compensate for the loss of centrifugal force. Also, because of the brittleness of ice, no effect is given for any structural support that a thick ice cylinder may provide to the shell. The drag coefficient on the shell during rotation will be in the turbulent boundary layer region. This can be verified by calculating the Reynolds Number which is approximately 4×10$^8$. Comparing this figure on a classic flat plate drag curve for laminar and turbulent flows versus Reynolds Number yields a drag coefficient ($C_d$) of approximately 0.0015.

Knowing the drag coefficient, the absolute drag can be calculated, and with that figure, the power needed to overcome the rotating air drag can also be calculated.

$$D_R = \tfrac{1}{2} \rho C_D S v^2. \tag{9}$$

Where
  $D_R$ = rotational drag;
  S = shell area = DL (ft$^2$).
  $\rho$ = density of air = 0.002378 slugs/ft$^3$.
  $D_R$ = 1509.12 lb.
Thus shaft torque is $$T = \tfrac{1}{2}(D_R D) \tag{10}$$

Where D = shell diameter in feet.
Shaft power is:

$$P = T N_s \tag{11}$$

Where $N_s$ = rotational speed (rev/sec).

Calculating the power necessary to overcome the air drag and converting it to horsepower yields approximately 146 hp. The cost to rotate the shell based on $0.05/kwh electricity is approximately $294.00/day based on continuous operation. If the 60 ft diameter tank were used for processing food, some raw food products that could be processed could cost $130,000/day. Thus, the cost of rotating the tank to overcome the rotational drag is very much less than the cost of the food itself.

Of course there will be other power losses such as those associated with the bearings for a large rotating chamber as well as other inefficiencies introduced into the system. However, as set forth in Tables 3 and 4 they are very small compared to the cost and value of the food or shale being processed.

Food processing can be conducted in such a way that the product will not spoil, than the other expensive food processing and storage techniques do not have to be used. For example, berries and other fresh fruits are stored by freezing them. Once frozen, the fruit must be maintained in a frozen state or it will spoil. Maintaining the fruit at freezing temperatures during storage, transportation and immediately prior to consumption uses large amounts of energy. The energy needed for rotation and the rest of the processing cycle is much smaller than the energy costs in maintaining food in a frozen state.

As will be discussed in greater detail hereinafter, the pyrolysis method takes place over a number of hours. Thus, a substantial portion of the rotational energy is in start up and slow down. The air drag, while still a factor in operational cost, is a decreased percentage of the cost. Decreasing processing time, moreover, allows the same capital costs to be used to process more raw material thus decreasing the capital portion of the processing costs.

Thus, to summarize the objects of the present invention, the main object is to disclose and provide a very large diameter vacuum chamber of substantially lower costs of capital and operation than heretofore thought possible. The capital costs are decreased by using very thin walls resulting in solving another object of improved heat transfer, which is also improved by the rotation. The configuration also yields another object of increasing the speed of the process. With food processing, a main object is to eliminate much of the condensing system associated with the vacuum chamber thus, decreasing the capital costs. In pyrolisis one object is to provide very much greater increase in processing speed while yielding a cleaner product.

Other objects of the present invention will be shown with reference to the detailed description of the preferred embodiment.

BRIEF DESCRIPTION OF THE DRAWINGS

FIG. 1 represents an end view, partially in section of the rotating chamber of the present invention mounted within an insulated room.

FIG. 2 shows a cross-sectional view of the rotating vacuum chamber of the present invention taken through plane II—II of FIG. 1.

FIG. 3 is a sectional view taken through plane III—III of FIG. 2 showing an area adjacent the inner surface of the chamber at its top.

FIG. 4 is a schematic view of the operating system of the present invention showing how waste heat can be used to melt some of the ice that has been chipped off the inside of the shell by a chipping mechanism.

FIG. 5 is a side view, partially in section, and FIG. 6 is an end view in section showing the cutter that removes ice from the inside of the cylindrical wall of the chamber.

FIG. 7 is a graph showing the relationship of the desirable water thickness versus the desirable shell thickness for various rotational speeds.

FIGS. 8 through 13 are directed primarily to the embodiment used for pyrolysis of hydrocarbon containing material.

FIG. 8 is a side elevation of the pyrolysis system showing the supporting materials handling systems.

FIG. 9 is an end view, partially in section, of the chamber used primarily in pyrolysis operations.

FIG. 10 is a side sectional view of a preferred embodiment taken through plane X—X and FIG. 9.

FIG. 11 is a plan view showing the details of the microwave heating system and the flues for conducting vapors.

FIG. 12 is a schematic of the system utilized for pyrolysis showing energy flows particularly for heating the hydrocarbon material during processing and preheating same.

FIG. 13 is a schematic showing the use of the shell as a condensing surface and a heat exchange system of the preferred embodiment to accomplish that end.

DETAILED DESCRIPTION OF THE PREFERRED EMBODIMENT

Tank Construction in General

Figure 1:
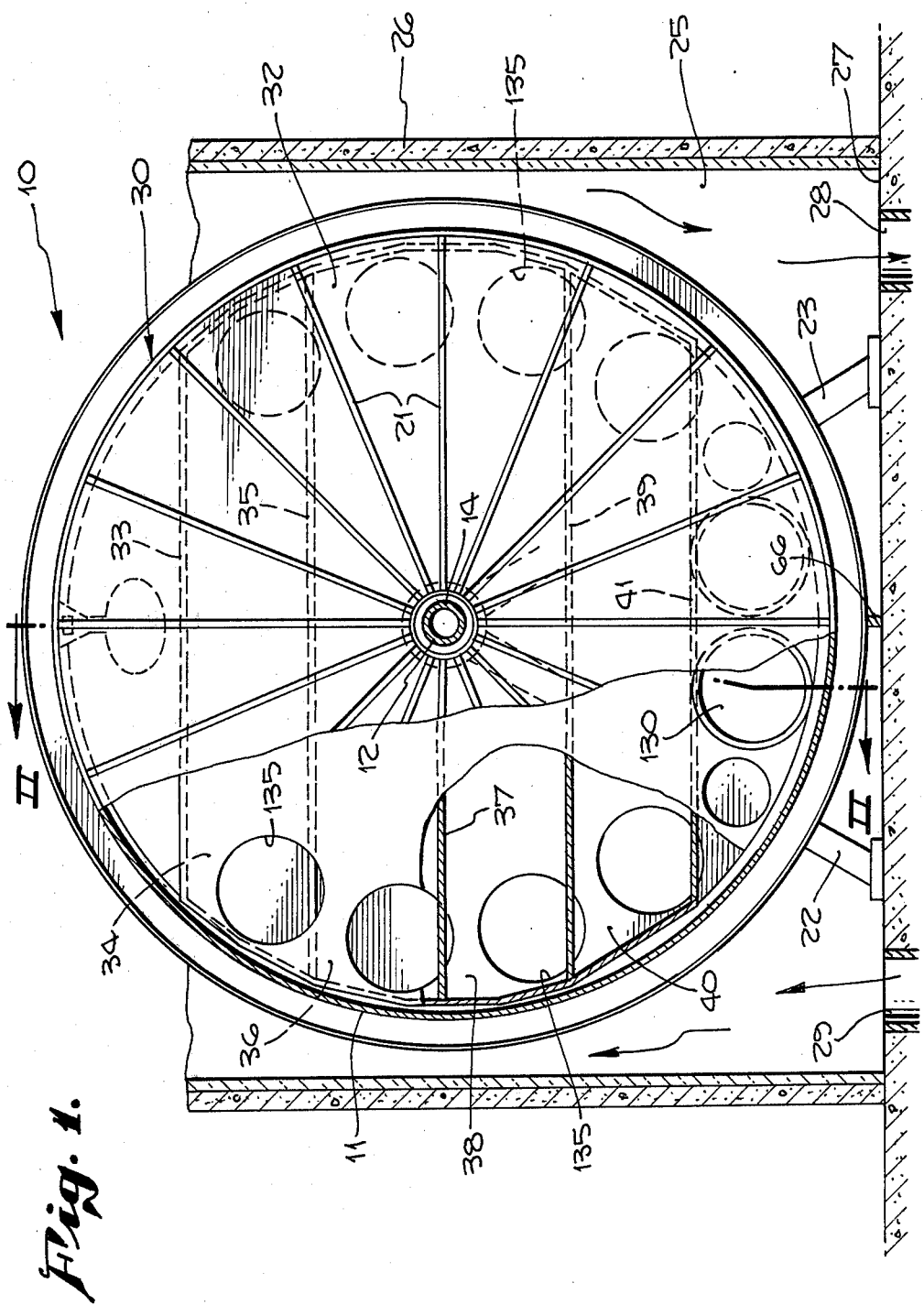
FIGS. 1 through 7 are directed primarily to the embodiment used for food processing.

The vacuum chamber of the present invention includes an airtight generally cylindrical wall or shell and a pair of end members of airtight material attached to the cylindrical wall in airtight relationship to create a chamber. In the exemplary embodiment in which the chamber is used for food processing (FIGS. 1 and 2), chamber 10 comprises a cylindrical wall 11, which for purposes of discussion will be considered to be 60 ft (18.3 m) in diameter. The length of the cylindrical wall is approximately 40 ft (12.2 m). The chamber in the other exemplary embodiment, FIGS. 9 and 10 is the same diameter, but slightly longer. There are structural limitations on chamber length due to compressive loading of the cylindrical walls. As the length increases, the walls begin to behave as a column in loading and become unstable. The lengths that were chosen for the chambers meet capacity requirements. The end members 20, 21 are attached to the cylindrical wall 11 to create an airtight chamber. Each end member, 20, 21 (FIG. 2), is reinforced either to the configuration shown in FIG. 2 so that they are thicker at their centers of pressure, or end members 220 and 221 may be shaped as shown in FIG. 10. Where elements in the second embodiment (FIGS. 9 and 10) are similar to elements in FIGS. 1 and 2, the same reference numerals are used proceeded by a "2". Thus, the construction of chamber 10 (FIG. 2) is similar to chamber 210 (FIG. 10).

In the first embodiment, a longitudinal shaft 12 passes through the center of each end member. The shaft may be formed of two sections, 13 and 14, and the end members 20 and 21 are fixed to shaft 12 through appropriate fittings 15, which must be constructed to withstand the large forces. Likewise, the shaft will have to be constructed to withstand the forces. It will be noted that the shaft is a column in compression. Because of its length, the shaft must be made sufficiently thick and of a large enough diameter to resist the large compressive forces.

The compression force from end member 21 on cylindrical wall 11 is a function of the diameter of the shaft. This can be calculated from the following derived equation:

$$F_c = \frac{L(r_v - r_x)}{r_v - r_c} + \pi(r)^2 P \quad (12)$$

where
$F_c$ = compressive force on shaft;
L = load on end member due to pressure differential = $\pi(r_v^2 - r_c^2)$
$r_v$ = radius of shell;
$r_x$ = distance from center of shell to centroid of pressure;
$r_c$ = radius of shaft; and
P = maximum pressure differential.

$$F_v = L - F_c \quad (13)$$

Table 2 which follows relates the shaft radius $r_c$ with $F_c$ and $F_v$

TABLE 2

| $r_c$ (inch) | $F_c$ ($10^6$ lbs) | $F_v$ ($10^6$ lbs) | Axial Compression on Shell(lbs/in) |
|---|---|---|---|
| 4 | 1.77 | 4.21 | 1862 |
| 8 | 1.79 | 4.19 | 1852 |
| 12 | 1.82 | 4.17 | 1842 |
| 16 | 1.84 | 4.14 | 1832 |
| 20 | 1.87 | 4.12 | 1820 |
| 30 | 1.94 | 4.05 | 1789 |
| 40 | 2.02 | 3.97 | 1754 |
| 50 | 2.10 | 3.88 | 1716 |
| 60 | 2.20 | 3.79 | 1673 |

Thus, as the diameter of the shaft increases, the force from the end members on the cylindrical wall decreases thereby decreasing the compression of the shell and increasing the compression on the shaft.

A shaft of large diameter is desirable to resist compression but there will have to be a balance because a large diameter shaft displaces useable volume inside the chamber. Because of differences in loading and unloading the chamber for the pyrolysis embodiments and because of differences in expansion because of the much greater temperature change in that environment, no complete shaft is used in the shale processing system as shown in FIG. 10. The shaft could also be eliminated in the food processing embodiment.

Vacuum means for evacuating the chamber are provided. In the exemplary embodiment, the vacuum means are indicated generally at 60 (260). The details of the vacuum means of the exemplary embodiment will be explained hereinafter, note that the vacuum means are within the chamber.

Drive means are attached to chamber 10 (210) for rotating the chamber along the longitudinal axis whereby centrifugal force of the rotating cylindrical walls 11 (211) acts against the force resulting from the pressure differential between the inside of the evacuated chamber and ambient pressure on the outside of the cylindrical wall to prevent the cylindrical wall from collapsing. In one exemplary embodiment, FIG. 2, the drive means 80 includes a drive motor 81 which rotates shaft 12 through differential, drive shaft and transmission 82, 83 and 84. Chamber 10 is supported above floor 27 by four posts, 22, 23 and 24 (the fourth post is not shown). The posts support the shaft 12 at bearings 50 and 51.

In another exemplary embodiment (FIG. 10), shafts 212 A and 212 B are fixed and are stationary on the support posts. Motor 281 drives chamber 210 around shafts 212 A and 212 B through supporting bearings 250, and 251. Bearings 250 and 251 must also permit movement of the chamber along the shaft because the chamber will expand and contract from heating and cooling. Such bearings are known in the art. The chamber is driven by motor 281 through belt 282 which engages the chamber. An auxillary motor 286 may also be used to overcome inertia during start up thereby allowing the chamber to reach its full rotational velocity quickly.

The *Tool Engineers Handbook* discusses calculations for adequacy of bearings and bearing life. If it is assumed that the shell or cylindrical wall 11 of the FIG. 2 embodiment is 0.5 in (1.3 cm) thick, it will weigh approximately 160,000 lb (72,700 kg). It is estimated that the combined weight of end members 20 and 21 and shaft 12 will be about 65,000 lb (29,500 kg). Adding in a six percent factor for extras yields a load on each bearing of approximately 120,000 lb (54,500 kg) empty. Of course, when the chamber 10 is fully loaded, additional weight will be added to the shaft. If the chamber is used for large size but low overall weight, the calculations are proper. Also a thickness for cylindrical wall 11 of 0.5 in is quite conservative as it has already been shown that a thinner wall is acceptable. Using the teachings in the *Tool Engineers Handbook*, a bearing can be selected having the following characteristics:
Bore—400 mm (15.75 in);
Diameter—650 mm (25.59 in);
Width—200 mm (7.87 in); and
C value of 765,000 lb.

This is a diameter series 1, a dimension series 31, and is a spherical roller bearing. There are off-the-shelf bearings with a size of 400×600×200 and with a C value of 720,000. Using the teachings of the *Tool Engineers Handbook*, the life of such a bearing is computed at 2.16×$10^8$ revolutions. If it is assumed that the maximum rate of rotation is about 106 rpm, the bearing useful life calculates to about 3.85 years, which is quite adequate.

A different bearing is chosen for a heavily loaded chamber.

As motor 81 begins to rotate shaft 12 and chamber 10, the vacuum means 60 can be started simultaneously. While chamber 10 is rotating at a slow speed, cylindrical wall 11 will only be able to resist a small pressure differential. However, at start-up, the pressure within the chamber will be reduced relatively slowly because of the large volume within the chamber and the large volume of vapor being sublimated.

Figure 2:
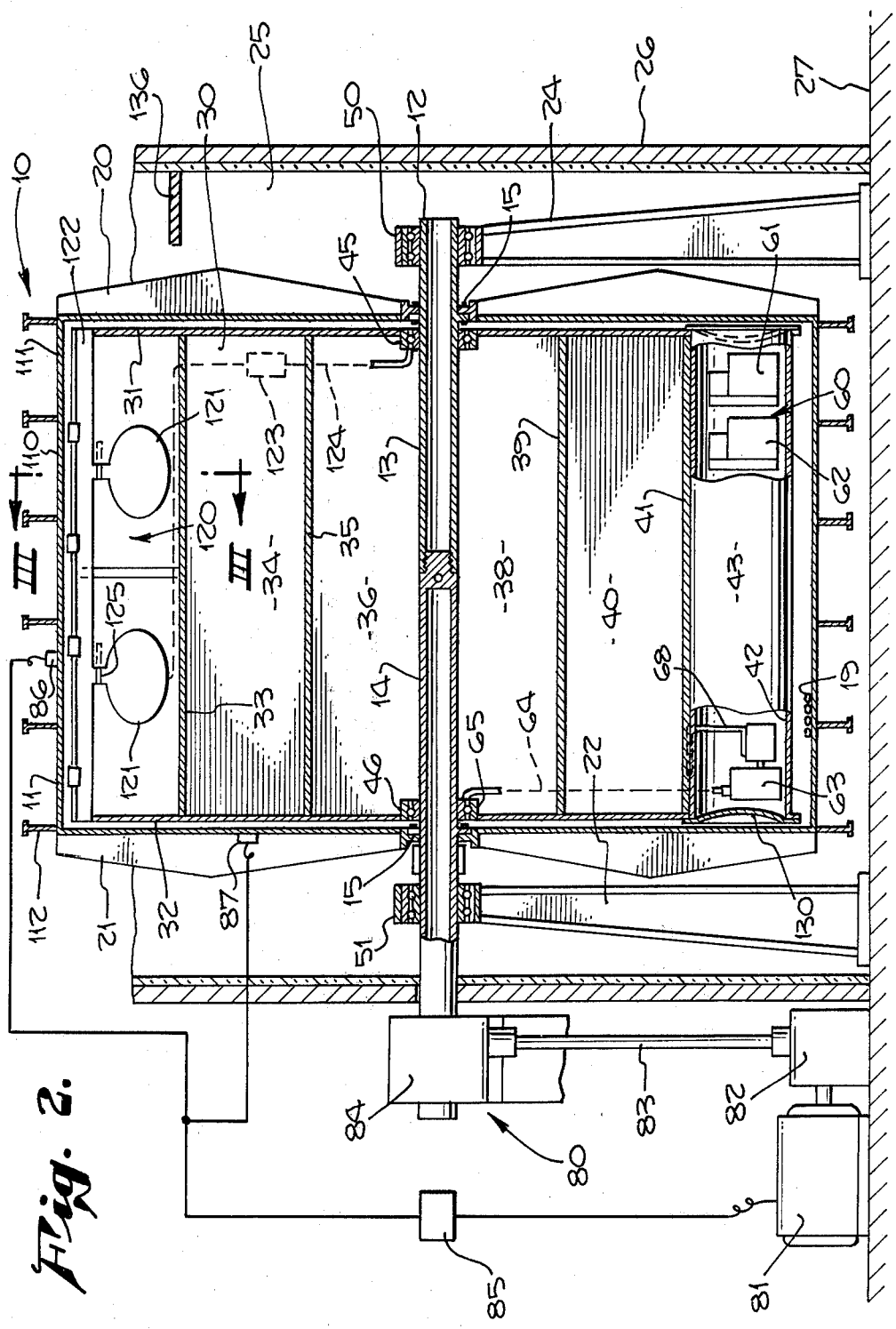

It would be desirable to have a control system so that the internal pressure will not be reduced to below where the centrifugal force on the chamber walls will reduce crushing from such pressure differential. The control system, which is shown schematically at 85 in FIG. 2 is intended to monitor both internal pressure and rate of rotation and acceleration and to control motor 81 and vacuum means 60. The controlled system also monitors strain guages 86 measuring strain in its shell 11. Ideally, it would also monitor the rate of ballast formation of ice (or petroleum) on the inside of the cylindrical wall 11 so that this factor could be used in allowing for greater vacuum at lower rates of rotation.

The control system can also maintain a safe system. If the drive system malfunctions or power fails, inertia will maintain rotation of the chamber while the pressure within the chamber could be raised through vents 87 tied to the control system 85. If the vacuum means malfunctions, the shell can resist the centrifugal force because it will be in tension, which it is much more able to resist, rather than in compression, which it poorly resists as shown in Equation (1). Because of potential balancing problems, a system for continuously monitoring and controlling the balance as ice build up and load changes is contemplated.

At start-up, the food being processed will also have a large water content and will be relatively warm, which will contribute to the vapor pressure within the chamber. In a sense, in the beginning, it will be more difficult to reduce the pressure in the chamber because of the additional molecules subliming from the food product.

Food Processing—The Low Temperature Embodiment.

For one embodiment, cooling means are provided for cooling the outside of the chamber to reduce the temperature within the chamber. The first exemplary embodiment (FIGS. 1-6) envisions the chamber 10 being mounted within an insulated room 25 having walls and ceiling 26. At least a portion of the chamber may be mounted below ground for safety and noise reasons and so that the adjacent earth will act as an insulator. Because of the extreme cold that will be produced within room 25, adequate insulation is most important. In the exemplary embodiment (FIGS. 1, 4), super-cooled air enters through conduit 29 in the bottom of room 25. It contacts cylindrical wall 11 which becomes a heat transfer surface to cause cooling in chamber 10. Air that is heated by the chamber is returned through conduit 28 where it can again be cooled for reentry through conduit 29. Baffle 66 prevents warmed air from flowing back to the cold inlet side. Because cylindrical wall 11 is thin and rotating, excellent heat transfer is achieved.

As previously stated, one of the important considerations of vacuum chambers is in dealing with the condensables. In the present invention, however, the inside of cylindrical wall 11 provides a cold condensing surface on which the vapor freezes uniformly. This layer of ice becomes the ballast to increase the weight on the inner surface. As it builds up, the rotational speed can continually be decreased or the vacuum can be increased at constant rotational speed while holding the forces on the wall at zero. Alternatively or additionally, lead or other non-structural ballast 19 can be attached to the inside of wall 11.

Another surprising result is that heat transfer is made more efficient. At very low pressure, the water vapor or other sublimating molecule has a long mean free path. If the chamber is stationary, molecules contact the walls and some bounce back to the product. In the rotating chamber, however, when most molecules contact the inside of the rotating cylindrical wall 11, they condense and will not bounce off because of the high induced gravitational forces due to the wall's rotation in addition to providing a cold freezing surface for the vapor molecules to stick to. In essence, the wall becomes almost an infinite sink because of the high g forces and the cold surface.

If the product being processed is food, it would most likely be undesirable to have the product rotating with the chamber. The high centrifugal forces would crush many food products especially delicate fruit. Rotating any product requires more energy, and significant problems occur because the load would not perfectly balance. Therefore, the product is mounted on an inner member, and the inner member is mounted on shaft 12 in a manner such that the inner member rotates with respect to the end member. Inner member 30 comprises end spoke members 31 and 32 with walls 33, 35, 37, 39, 41 and 42 therebetween. The spokes may be replaced by a different grid. In the exemplary embodiment, the walls are not solid but have holes or gaps therethrough so that migrating vapors can pass through the walls to the inside of cylindrical wall 11. Because the walls are not solid, inner member 30 is sometimes referred to a cage.

It will also be recognized that because the vacuum means 60 give off heat which is radiated toward the product within the chamber, the heat will raise the product's sublimation vapor pressure. Consequently, the increase sublimation vapor pressure increases the sublimation mass transfer to the vapor state which condenses on the inside of cylindrical wall 11. A heat exchanger 68 could direct the heat to the walls of the cage.

As previously stated, in the exemplary embodiment the motor 81 drives the shaft causing rotation of the chamber. The end spokes 31 and 32 of inner member 30 are mounted to the shaft on bearings 45, 46 so that the shaft and thus the end members 20 and 21 and cylindrical member 11 can rotate with respect to the inner member 30. It is also possible to have a stationary shaft or shafts (see e.g. FIGS. 9 and 10) with the inner member 230 fixed thereto and with the end members 220 and 221 mounted on bearings for rotation with respect to the stationary shaft.

When the end members 220, 221 are rotating with respect to the shafts 212 A and 212 B, there will have to be a seal between the shafts and the end members to prevent leakage which would destroy the vacuum. Ferrofluidic seals or other sealing means permit rotation of members while preserving the seal especially at the relatively low angular velocities that will be required in the present invention. Ferrofluidic seals rely on a colloidal suspension of magnetic material in a oil. When the oil is subjected to a magnetic field, its viscosity rises to act as a seal.

Inner member 30 fills substantially the entire volume of the chamber as can be seen in FIGS. 1 and 2. By mounting the vacuum means 60 near the bottom of inner member 30, the center of gravity of the inner member is below the shaft so that the inner member does not rotate when the chamber and the shaft rotate. If the vacuum means 60 were mounted closer to the longitudinal shaft 12, friction in bearings 45 and 46 might generate sufficient torque to be transferred to inner member 30 to overcome the gravitational forces to cause it to rotate. Therefore, the present location of the vacuum pumps, which can be anticipated to be of greater density than the food in the remaining portion of the inner member, yields a low center of gravity preventing such rotation.

In standard vacuum chambers, the gas would first have to pass through a condenser to remove the condensables before reaching the vacuum pump. In the present invention, the wall 11 of the chamber is the condenser. An external condenser is unnecessary. The conductance term for the condenser can be ignored and less power will be needed for the vacuum pumps.

In the first exemplary embodiment, the vacuum means is a plurality of vacuum pumps 61 and 62 which are mounted in the vacuum equipment chamber 43 of inner member 30. The vacuum pumps 61 and 62 cooperate with exhaust compressor 63 which directs the exhaust gases through line 64 and out rotating seal 65 adjacent shaft 12. Because of the lack of condensables at the vacuum pumps 61 and 62, compressor 63 can exhaust the evacuants from the chamber under relatively high pressure (the pressure will decrease as the pressure within the chamber decreases).

Large conduits from the chamber to the vacuum pumps are not needed because there is no concern about a large pressure drop from the chamber to the pumps. When coupled with the elimination of duplicate conventional condensers, the present invention saves substantially in capital and operation costs.

As explained earlier, the food product sublimates, and the vapors condense in the solid phase on the inside of the rotating chamber. This occurs because the heat of condensation from the walls is removed by refrigerating the outer surface by a cold airflow. Although the ice will serve as a ballast, it is anticipated that too much ice will eventually build up on the inside of the chamber. Therefore, a system for removing excess ice has been developed. The present invention includes lathe means adjacent the inside of the cylindrical wall, and lathe driving means for moving the lathe along the length of the cylindrical wall as the wall passes thereover upon rotation of the chamber for removing excess ice from the inside of the cylindrical wall. As explained in more detail hereinafter, the ice that is chipped off is caught and collected, a batch is then melted and the liquid is pumped under high pressure through a rotating seal between the shaft and the end members. Alternatively, ice chips can be kept in the solid phase and transported, for example, by a auger in batches to the outside through the center shaft.

Figure 3:
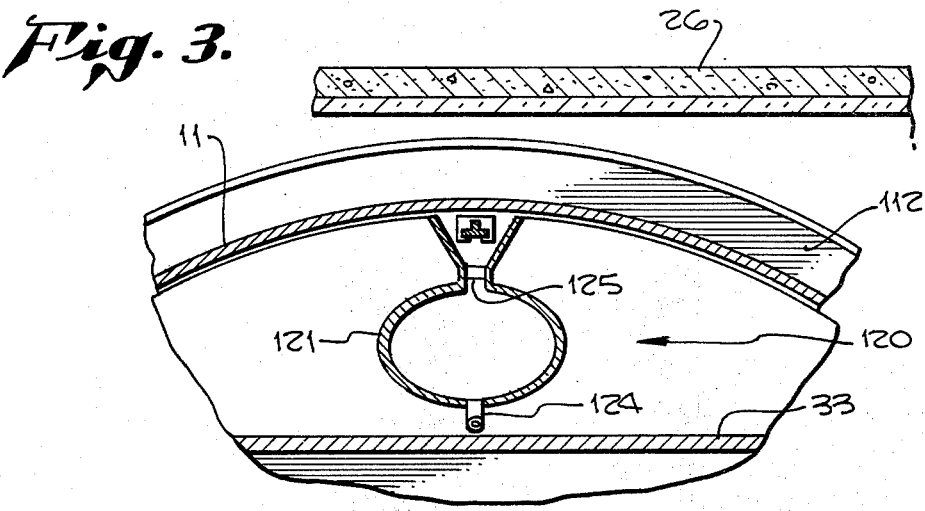
Figure 4:
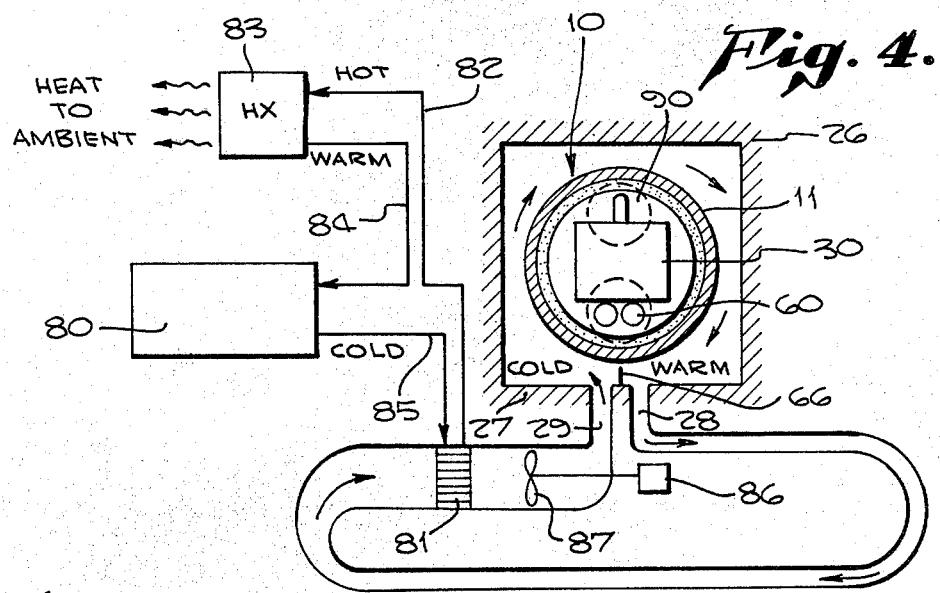
Figure 5:
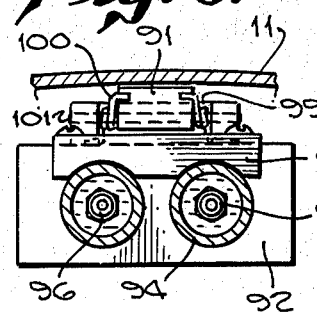
Figure 6:
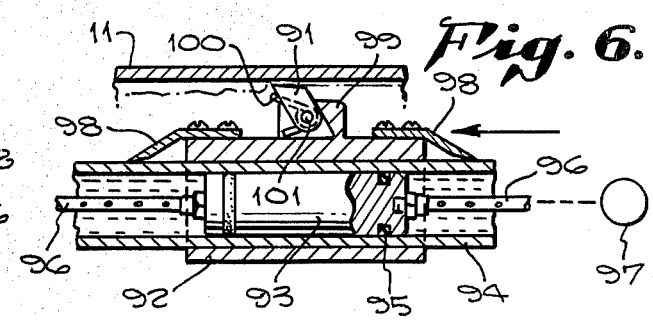
Figure 7:
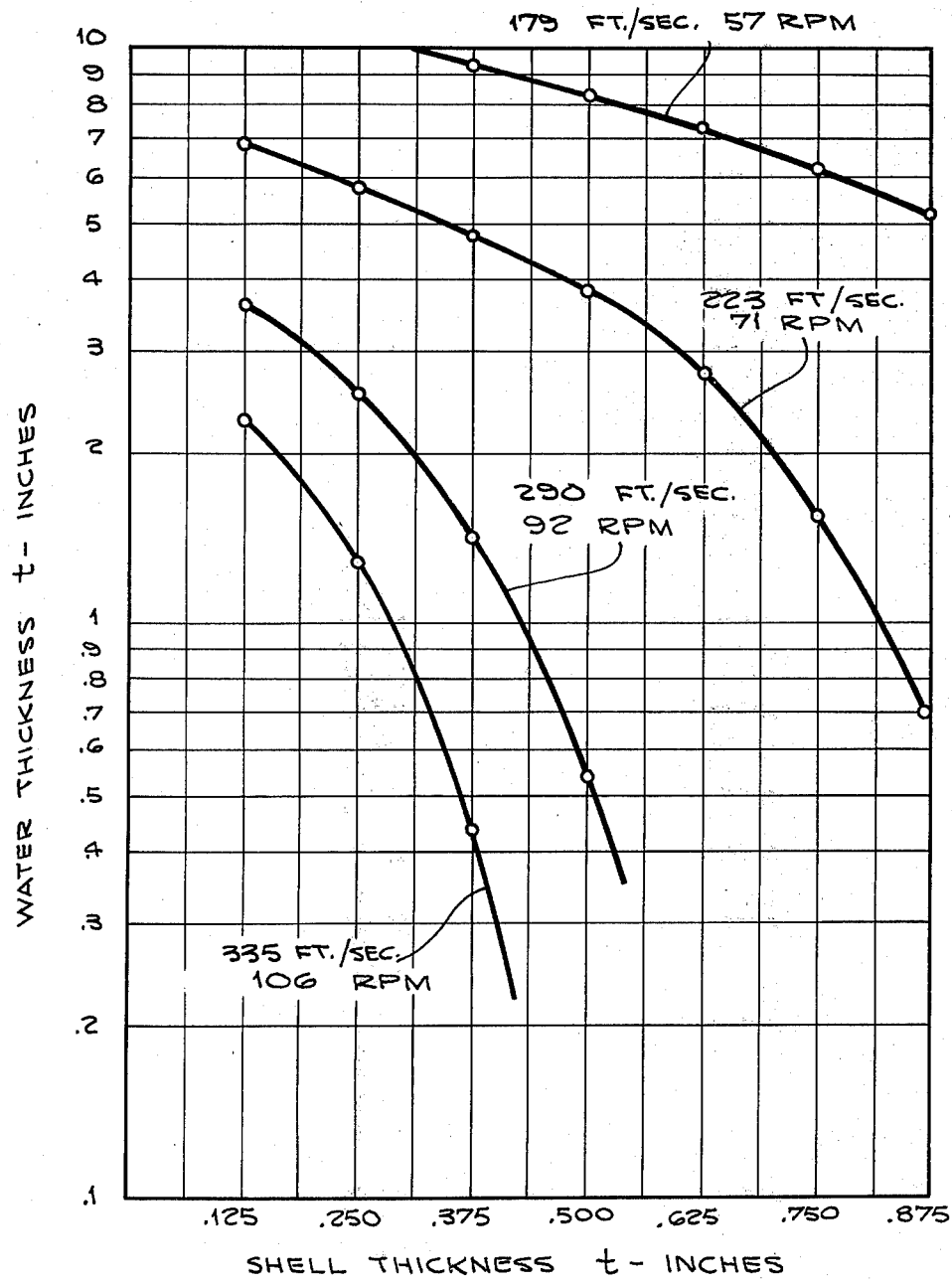

In the exemplary embodiment, especially that shown in FIGS. 3, 5 and 6, lathe means 90 comprises a cutting blade 91 mounted on cutting head 92 that fits on the lathe shafts 94. The lathe shafts are mounted lengthwise in the chamber at the top and adjacent the inside of the cylindrical wall. More than one cutter is shown in FIG. 2 to decrease the length of shafts 94. Sections of lathe shaft 94 can be supported on inner member 31. Lathe drive members 93 are mounted in each lathe shaft for movement therein. Each lathe drive member can be moved in lathe shaft 94 in many ways, but the exemplary embodiment uses hydraulic power because of its fine control. As shown in FIG. 6, hydraulic pump 97 can control the fluid pressure in each lathe shaft on either side of lathe drive member 93 to accurately position lathe drive member 93. The lathe drive member is magnetically coupled to the head 92 so that when the lathe drive member 93 transverses the lathe shaft 94, the magnetism pulls the cutting member along the inside of the cylindrical wall to cut the ice therefrom.

By having a pair of parallel lathe shafts 94, the force on cutter 91 from the rotating ice can be spread over a greater moment. A single lathe shaft 94 could not be circular, because the force from the ice would rotate the support around the lathe shaft, but one noncircular shaft could replace the pair of circular shafts shown in the exemplary embodiment.

A pair of scrapers 98, attached to support 92, extends from both ends of the support to remove ice that may form or pile up on the lathe shafts 94 after being removed from the inside of cylindrical wall 11. To facilitate removal, the lathe shafts could be Teflon coated. To prevent ice buildup, the hydraulic fluid could be heated to warm the lathe shafts to melt any ice. Because there is little circulation of the fluid, however, in the exemplary embodiment, flexible tubes 96 with perforations therethrough are attached to both ends of the lathe drive member 93 and are connected to the hydraulic pump 97. Warmed fluid is pumped through tubes 96 to warm the portion of the fluid near the cutter where ice buildup will be occurring. As an alternative, the lathe drive member 93 could have a longitudinal opening therethrough so the hydraulic fluid could circulate. If the diameter of the opening is controlled, positioning of the lathe drive member can still be accurately determined.

Lathe drive member 93 should be relatively long to lower the force on O-rings 95 from the torque on the lathe drive member.

Cutter 91 is urged about pivot 101 to its upright position by spring 100 and by the force of the cutter against the ice as the cutter moves from right to left in FIG. 6. Stop 99 prevents the cutter from rotating beyond the upright position. After the cutter travels the length of lathe shaft 94, it should rapidly travel to its initial position where ice will be thickest. Although the blade could stay upright and cut a narrow spiral, the spring 100 allows the blade to pivot counterclockwise as it moves to the right (FIG. 6).

One of the advantages of the hydraulic system is that there is no backlash, a common problem in screw drives. Although in the present invention, the drive system was designed to overcome problems if threads of a screw drive became filled with ice, the zero backlash feature is helpful. A screw drive could be used instead in the present invention. If so, it could be double threaded with higher pitch threads running across the low pitch ones for a faster return trip for the support 92 at the same rate of rotation.

The rate of traverse of the lathe can be calculated using certain approximations, but it will ultimately be determined by experimentation and will vary depending on the water content of the food being processed. The buildup rate will also be a function of the actual process because different processes operate at different pressures, and the pressure and temperature within the chamber affects the sublimation rate.

The formation rate of ice is a function of the amount of product being processed in a given time and the percent of water loss, and the thickness of the ice buildup is also a function of the area of the cylindrical wall. It has been theoretically calculated that if it is desired to process 5,000 tons of wet product per month, the ice formation rate on the inside of the 60 foot diameter×40 foot tank would be approximately 0.31 in/hr with an ice formation rate of about 12,200 lbs/hr or about 24.5 gallons/minute, assuming that the product is approximately 89% water. If only 2,000 tons of wet product is to be processed each month, the ice thickness rate would drop to 0.12 in/hr yielding an ice formation rate of approximately 4900 lbs/hr or 9.8 gallons per minute.

As the ice builds up during processing, the lathe translates parallel to the axis of rotation to cut or chip away excess ice, thus keeping the ice thickness at an average constant value. Means are provided under the lathe means for catching the ice chipped off the cylindrical wall. In the exemplary embodiment, this feature is shown at 120 and is intended to run the entire length of the chamber. The ice chips are then transported in the exemplary embodiment by means of a conveyor 122 by a piston or to one or more retorts 121 which can be sealed by cover 125. The ice can be melted by waste heat from heat exchanger 83 (FIG. 4) to change it to the liquid phase in batches, and it can be pumped by pump 123 through line 124 under high pressure through a rotating seal through end member 20 adjacent shaft 12. By having more than one batch retort 121, one could be sealed, and the ice melted while the other collects ice chips. Pump 123 could be switched to pump from one or the other retort. It would have to have sufficient size to pump all of the ice that is chipped, and that value has been theoretically calculated to be between about 9.8 gallons per minute and 25 gallons per minute. Alternatively, solid ice could be transported by conveyor and transported in batches out of the chambers as a solid.

It has been previously calculated that a chamber having a cylindrical wall 0.5 in thick would need a residual ice layer of about 0.57 in for there to be no inward forces not compensated by centrifugal force when the chamber is rotating at mach 0.26. The following conditions would prevail at the inside ice surface:

$v_{ice}$=290 ft/sec, N=92.4 rpm; and ice buildup rate for 3,000 tons of production per month has been calculated to be approximately 0.187 inches per hour.

The cutter lead can be calculated using the following equation:

$$(L_c) = l_s/TN \qquad (14)$$

where
$(L_c)$=cutter lead (in/rev);
$l_s$=shell length (in);
N=rotational speed (rev/hr); and
T=cutter traverse time for full length of chamber (hr) (or time to traverse portion of chamber of one of plurality of cutters).

The cutter traverse velocity equals $l_s/T$ (3600) in in/sec.

For equilibrium, the ice removal rate will equal the ice formation rate, and the ice removal rate equals $D_c(L_c)v$ where $D_c$=depth of cut (in); and
v=surface velocity of cylindrical wall (in/sec).
At equilibrium, $$D_c = Tt \qquad (15)$$

where t=ice formation rate (in/hr).

The chip removal rate then becomes $Tt(L_c)v$, and at equilibrium, this value is equal to the formation rate of ice, which is a function of the wet product load and the percentage of water in the food.

Various chip removal rates have been calculated, and are set forth in the following table.

TABLE 3

| T-Traverse Period (Hr.) | (Lc) Cutter Lead (in/rev) | $D_c$ Depth Cut (in) |
|---|---|---|
| 1.0 | .087 | .19 |
| 0.9 | .096 | .17 |
| 0.8 | .108 | .15 |
| 0.7 | .124 | .13 |
| 0.6 | .144 | .11 |
| 0.5 | .173 | .09 |
| 0.4 | .216 | .07 |
| 0.3 | .288 | .05 |
| 0.2 | .433 | .04 |
| 0.1 | .865 | .02 |

It is estimated that an ideal traverse for a single cutter period would be approximately 0.7 hours with a yielding a cutter lead of 0.124 in/rev and a depth of cut of 0.13 in.

Table 4 sets forth the approximate energy costs per month for food processing for a 60 ft diameter×40 ft long rotating chamber assuming 3000 ton per month based on $0.05/kwh.

TABLE 4

| Function | HP-HR | COST ($) |
|---|---|---|
| 1. Start up of shell-to speed in 1 hr | 22362 | 834 |
| 2. Pump down 113097 cu ft to 0.5 mm Hg | 3914 | 146 |
| 3. Sustaining pressure at 0.5 mm Hg | 90817 | 3,387 |
| 4. Air compressor pump down-175psz | 3701 | 138 |
| 5. Air compressor sustaining | 85861 | 3,203 |
| 6. Bearing friction | 10933 | 407 |
| 7. Air drag | 133282 | 4,972 |
| 8. Product Sublimation Heat | 224495 | 11,225 |
| 9. Product Heat of Condensation on Shell | 415887 | 15,498 |
| 10. Super Cool Shell Ice | 69591 | 2,596 |
| 11. Building Heat Leak | 65730 | 3,286 |
| 12. Cool Raw Product to 32° (0° C.) | 132042 | 4,925 |
| 13. Freeze Raw Product for Storage | 420786 | 15,695 |
| 14. Super Cool Raw Product | 167140 | 6,234 |
| 15. Cold Storage Leak | 65730 | 3,286 |
| Total | | $75,832 |

Only items 1, 4, 5, 6 and 7 are unique to the system of the present invention, and their cost is only about 13% of the total cost.

The processing cost per dry pound, assuming 3000 tons/mo, 89% water = 75,832/(3000×2000(1−0.89))=$0.115/lb, and the processing cost per wet pound is less than $0.013/lb.

It will also be recognized that the end members 20 and 21 exert a load in compression on cylindrical wall 11. In order to eliminate the risk of collapse of the cylindrical shell in the longitudinal direction due to the large external air pressure forces, the wall can be constructed as short cylinders such as 110 and 111 attached together by circumferential flanges 112. Flanges 112 are intended to be circumferential with smooth fairings to minimize aerodynamic drag.

The inner member 30 is divided into a plurality of rooms 34, 36, 38 and 40 which are separated by walls 33, 35, 37 and 39. These enclosures are where the food to be processed is placed. Each of these rooms would be approximately 10 feet tall and slightly less than 40 feet long. Racks, which are not shown, could be mounted in the rooms for storage of the products. The rack may have embedded heat exchangers to transfer waste heat from pump compartment 43 to the frozen material undergoing freeze drying. Some heat energy is used to provide phase change from the solid to the vapor states for the material.

The end members 20 and 21 may include one or more hatches 30 (FIG. 1) for providing access to the chamber. There would also, therefore, be openings such as 135 into cage 30 for providing access to the various rooms. Because of the large size of the rooms, the product can be mechanically loaded therein. An elevator system (not shown) may be provided for moving the food from level to level of the chamber or the room 25. In that regard, stationary or moveable platforms 136 could be mounted to outside wall 26 on both sides of the chamber for ease in moving products into and out of the chamber. After complete processing of food, new wet products could be brought in from one side of the chamber while processed food was being removed from the other end.

Hydrocarbon Pyrolysis-High Temperature Embodiment

As is readily apparent, the chamber shown in FIGS. 9 and 10 shares many features of the chamber of in FIGS. 1 and 2. Chamber 210 which is formed generally of cylindrical wall 211 and end members 220 and 221 rotates on shafts 212A and 212B. To conserve space within processor 210, the shaft does not extend through the chamber. The chamber is supported on four supports (only three are shown in the drawings) 222, 223 and 224. The shafts are secured at the top of the supports and extend inward to the chamber. Although with modifications the shafts could rotate, in the exemplary embodiment, the shaft is intended to be stationary, and the chamber rotates about the shaft on bearings 250 and 251. Because of the large temperature variations will cause the chamber to expand and contract longitudinally, bearings 250 and 251 are designed to permit transverse movement of the bearing along the shaft.

Pyrolysis takes place in bins shown generally in internal container 230 (FIG. 10). Although the structure of the internal container will be discussed in more detail hereinafter, the main supports are shown and include end supports or spokes 231, top and bottom walls 241 and 242, and internal supporting members 233. End members 231 are attached to the shafts 212A, 212B and are stationary therewith. Thus, chamber 210 rotates around internal container 230. Seals 234 are provided to seal the inside of the chamber from atmosphere. As shown somewhat schematically, motor 281 acting through pulley 282 a gear train, a transmission or another means rotates chamber 210. An auxillary motor 286 may be provided to accelerate the chamber and a generator 287 may brake the chamber during cycling so that additional power may be obtained.

The vacuum pump system 260 in this embodiment may be similar to that shown in the first. It is slightly modified and includes a plurality of vacuum pumps (only two of which are shown) 261 and 262 mounted inside sealed compartment 265. The inlets 467 to the vacuum pumps extend through the compartment and the pump exhausts into compartment 265 at or near atmospheric pressure. One or more compressors 263 pressurizes the output of the vacuum pumps and exhausts the evacuate through narrow tube 264 to the outside of the chamber.

Figure 11:
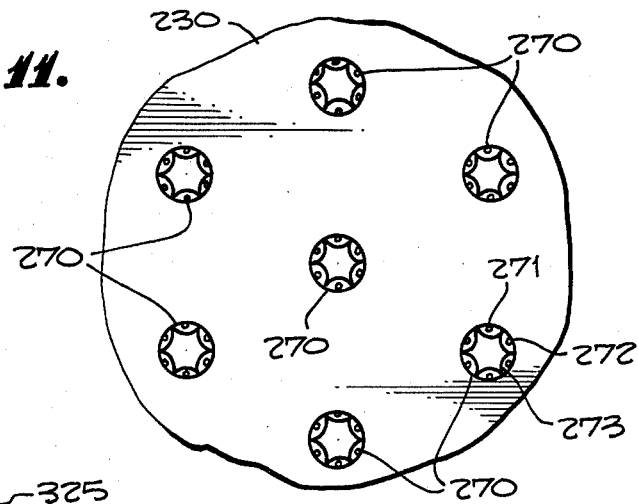

The container 230 will be filled with crushed oil shale, tar sands or other material to be pyrolyzed, and it must be heated to the pyrolytic temperature. In the exemplary embodiment, microwave radiation provides the heat energy. Although they cannot be seen in FIG. 10, in FIG. 11 there are a plurality of vertical tubular heating members 270 throughout container 230. The space between adjacent heating members 270 is filled with crushed shale. Extending in each heating member are microwave antennas 271, that radiate energy causing the shale to reach desired temperatures. The heating members are actually perforated tubes 272 with reflectors 273 mounted behind antennas 271. As the shale is heated and pyrolysis begins to occur, tubes 272 conduct the vaporized gases out of the container and into the space between the container and the chamber. Alternatively, instead of antenna, element 271 could also represent resistance heaters that can be wound around the inside of the tubular member 270 for conventionally heating the shale. Heat exchangers or other heat source could also be used. Other heating systems are also contemplated such as steam pipes or any other conventional heat transfer medium. The size of tubes 271 and their relative spacing will have to be determined from experimentation in order to optimize the process. As the heating members are smaller and farther apart, there will be less void area so that more shale can be processed in the container. However, having the heating members farther apart will slow the process.

As the pyrolytic reaction continues, the hydrocarbon vapor formed migrates at molecular speeds to the cylindrical wall 211 of the chamber. As set forth in more detail hereinafter, walls 211 will be cooled somewhat so that the gas will condense on the inside of the chamber wall. There are a number of ways in which the condensed petroleum could be removed from the chamber. In the exemplary embodiment at least one outlet tube 283 extends through chamber wall 211 (FIG. 10). The liquid petroleum that forms a film on the inside of the rotating chamber wall 211 is driven by centrifugal force through tube 283 into a trough 282 where it collects and can be pumped away. A valve and a control system therefor (not shown) is provided to open the valve and allow liquid petroleum to flow through tube 283 into trough 282 only when the end of the tube is over the trough. Because there will be a pressure differential between the inside and the outside of the chamber of 14.7 psi at sea level, the length of the tube will have to be sufficiently long so that the head caused by the centrifugal force is greater than the pressure forces tending to prevent the petroleum from flowing out of the tube.

The inside end of tube 283 extends into the chamber a short distance. Even though the present process is substantially cleaner than many other pyrolytic methods, particulate matter will form. It is anticipated that much of the particular matter will drift through the petroleum to the chamber wall because of the high g forces. Liquid petroleum could be drawn out of the chamber while the particles collected below the top of the tube. The particles would be allowed to accumulate until their thickness reached the highest of the top of the tube at which time they could be removed by cleaning the inside of the chamber.

There is also a possibility that some liquid petroleum may fractionalize in which case different components would form different bands on the inside of the chamber wall. If this occurs, a plurality of tubes of varying heights could be used to draw off each fraction, or the tubes could be of the same height, and the petroleum could collect and be drawn off at different times.

The loading and unloading system is designed to recharge the unit quickly. In this regard, end member 221 has one or more openings 313 therethrough (FIG. 9) and these are sealed by hatches 314. Crushed or rubbelized shale stored in one or more loading bins 310 is fed by gravity or other means to movable conveyor 311 which slide on supports 312. When the chamber is to be recharged, it is stopped to align openings 313 with the conveyors. When hatches 314 are opened, conveyors 311 are slid through openings 313, and shale is dropped into container 230 within the chamber. The conveyor may be slowly withdrawn after the right end (FIGS. 8 and 10) of the container is filled to fill the center and left end so that the entire container is relatively uniformly filled. Hatches 314 are sealed, the chamber rotates and the shale is further heated to pyrolitic temperature.

After the reaction is completed, spent shale must be removed quickly. In the exemplary embodiment a plurality of permanently installed augers 315 at the bottom of the containers are fed by inclined walls 316 and 317. Augers 315 are aligned with openings 318 in chamber end wall 220, and when hatches (not shown) are removed, the augers 315 are coupled to external augers 319 which are movably mounted to move into engagement with augers 315. The augers carry the spent shale to a truck 320 or another conveyor.

It is contemplated that loading and unloading could occur simultaneously. The augers would remove spent shale until they encountered fresh ore.

Figure 12:
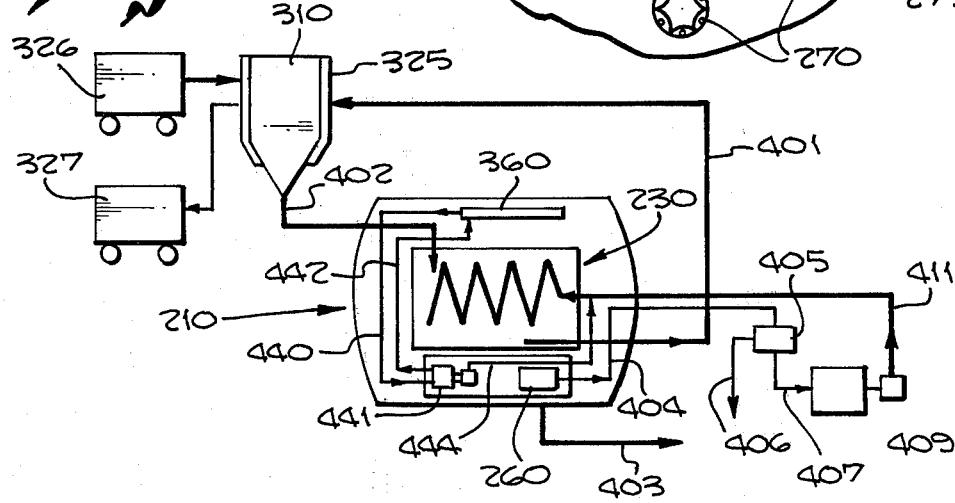

It is desirable to preheat the shale to decrease the heating time of the shale within the chamber. Referring to FIG. 12, when spent shale is removed from chamber 210, it is still very hot, and it is desirable to use this residual heat for heating the next batch of shale ore. There are a number of ways in which this residual heat can be transferred to the cooler ore, and known heat exchangers could be provided. Line 401 represents the heat being transferred to loading bin 310. In the schematic of FIG. 12, heat exchanger 325 is shown around loading bin 310, but it is understood that various types of heat exchangers could be provided. Cart 326 represents ore loaded into the loading bin 310, and cart 327 represents spent shale being carted away after its residual heat has been removed. Line 402 represents the preheated ore being fed into the chamber, and line 403 represents the product being directed to storage or further processing facilities.

Some of the gas will not condense on the inside of the chamber but will be removed through the vacuum pumps 260. After passing through line 404, the gas may pass through a condenser 405 where the condensable portion may be extracted from the noncondensable gas. The condensable portion passes through line 406 to storage or further processing. Much of the noncondensable gas is of low BTU quality, but it may be burned, and it is shown being directed through line 407 to turbogenerator 409 for electrical power for powering the electric heaters within the chamber and for rotating it. The electrical power is shown to pass schematically through cable 411, and as shown in FIG. 10, the power passes through shaft 212B into the chamber. Any power from line 411 used to power or control rotating elements passes through slip rings 412 for power transmission from stationary shaft 212B to rotating chamber 210.

Figure 13:
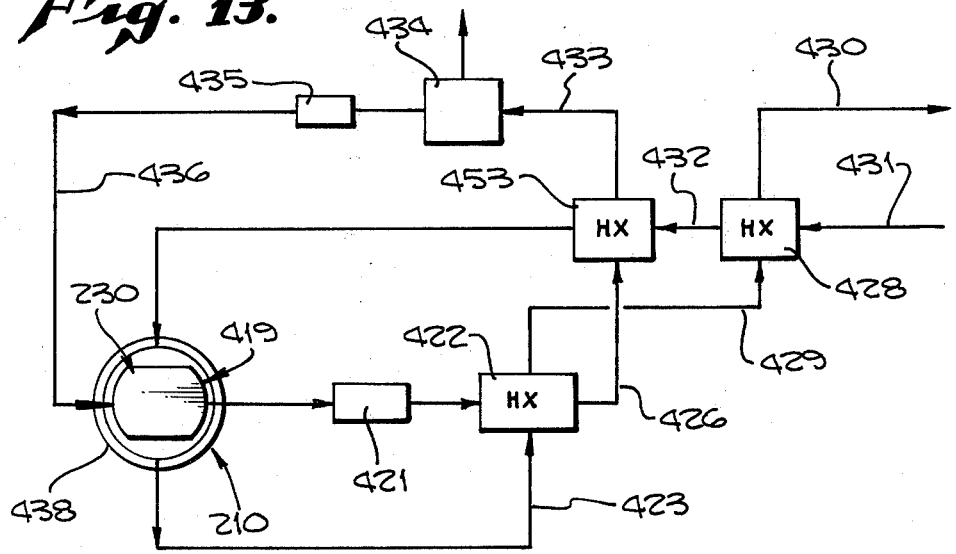

Water or steam could be the heat exchange medium in heat exchanger 325, and cold water can be sprayed on chamber 210 for cooling it and causing the chamber wall to act as a condensing surface. Oil shale also contains large amounts of water which will have to be removed during processing, and it would be desirable to save all water for further use in shale processing. Most shale in the United States is found in arid climates. Water vapor which is pumped out of the chamber through line 419 and cooling water vapor that is heated through contact with the outside of the chamber wall is compressed in compressor 421 where it passes through heat exchanger 422. The path of the spent shale in FIG. 13 is indicated at 423, and the compressed water vapor is superheated in heat exchanger 422, and it is directed to heat exchanger 425 through line 426. The spent shale, which has lost some of its residual heat in heat exchanger 422 next passes to a solid to solid heat exchanger 428 as shown by line 429. Mined crushed or rubbelized shale ore also passes into heat exchanger 428 as shown from line 431, and the spent shale travels through line 430 to a disposal area. The ore that is heated in heat exchanger 428 passes to heat exchanger 425 as shown by line 432 where it is heated to even higher temperatures by the superheated steam from heat exchanger 422. The two stage heat exchanger helps solve the problem that solid-to-solid heat exchanges are inefficient, and by utilizing one heat exchanger for water, the water can be reused in the process. Water partially cooked in heat exchanger 425 passes through line 433 to a condenser cooler 434 where the heat can be dissipated to the atmosphere. The cooled water is pumped by means of feed pump 435 through line 436 as a spray on the outside of the rotating shale and between an insulated housing 438. Thereafter, the water that is heated from the warmer shale is recycled when it is vaporized on the shale.

Referring back to FIG. 12, a condenser 360 is mounted within chamber 210 adjacent the rotating shale. It cools the hydrocarbon vapors to assist in condensing them. The heat from the condenser in the form of steam is directed through line 440 into a turbogenerator 441. The spent steam is directed back through line 442 to condenser 360. The additional electricity generated by turbogenerator 441 is fed through line 444 to assist in heating the shale during processing.

The use of much of these heat exchangers will depend on many analyses. It is noted, however, that many of the proposed shale processes are very wasteful. Those that burn shale waste a substantial portion of the ore and also create large amounts of pollution. Although the present invention entails a large, complex processing operation, it is intended to be relatively clean, utilizing what might be considered waste energy and by-products for further use in processing. Insofar as the additional systems are used, energy and raw materials will be conserved.

Thus, the vacuum chamber has been described which meets the aforementioned object and other objects apparent herein. It will be understood that various modification changes may be made in the configuration described above which may come within the spirit of the invention, and all such changes and modifications coming within the scope of the appended claims are embraced thereby.

I claim:

1. A vacuum chamber including an airtight, generally cylindrical wall and a pair of end members of airtight material attached to the cylindrical wall in airtight relationship to create a chamber and vacuum means for evacuating the chamber, the improvement comprising the provision of:

drive means attached to the chamber for rotating the chamber along the longitudinal axis at a sufficient velocity for the centrifugal force of the rotating cyclindrical wall to balance against the force resulting from the pressure differential between the inside of the evacuated chamber and ambient pressure on the outside of the cylindrical wall to prevent the cylindrical wall from collapsing.

2. The chamber of claim 1 further comprising a shaft mounted along the longitudinal axis, an inner member, and means for mounting the inner member and end members to the shaft such that the end members rotate with respect to the inner member.

3. The chamber of claim 2 wherein the inner member fills substantially the entire volume of the chamber, the vacuum means being mounted near the bottom of the inner member to provide a center of gravity of the inner member below the shaft so that the inner member does not rotate when the chamber rotates.

4. The chamber of claim 2 wherein the inner member comprises a plurality of rooms separated by perforated walls whereby the product to be processed is placed within the rooms, and the perforations through the walls allow movement of gases in the inner member.

5. The chamber of claim 4 further comprising at least one hatch means through the end member and a plurality of openings through at least one end wall of the inner member, the hatch means aligning with the openings upon rotation of the chamber to provide access to the rooms of the inner member.

6. The chamber of claim 3 wherein the inner member comprises a plurality of rooms separated by perforated walls whereby the product to be processed is placed within the rooms, and the perforations through the walls allow movement of gases in the inner member and heat exchanger means between the vacuum means and the perforated walls for heating the walls to heat product processed in the inner members.

7. The chamber of claim 2 further comprising exhaust means through at least one of the end member adjacent the shaft for exhausting evacuants out of the chamber.

8. The chamber of claim 1 further comprising means for cooling the outside of the chamber to reduce the temperature within the chamber and for providing a cooling surface on the inside of the cylindrical wall.

9. The chamber of claim 8 further comprising lathe means with a cutting head thereon adjacent the inside of the cylindrical wall and lathe drive means for moving the cutting head along the length of the cylindrical wall as the wall passes thereover upon rotation of the chamber for removing excess ice from the inside of the cylindrical wall.

10. The chamber of claim 1 further comprising lathe means with a cutting head thereon adjacent the inside of the cylindrical wall and lathe drive means for moving the cutting head along the length of the cylindrical wall as the wall passes thereover upon rotation of the chamber for removing excess ice from the inside of the cylindrical wall.

11. The chamber of claim 10 further comprising means under the cutting head for catching ice chipped off the cylindrical wall, and removal means for directing the ice through at least one of the end member adjacent the shaft to the outside of the chamber.

12. The chamber of claim 11 further comprising melting means for heating the ice to change it to water before passing the water to the removal means.

13. The chamber of claim 12 further comprising means for sealing the melting means whereby a batch of chipped ice may be heated in the melting means to change such ice into liquid water without exposing the water to the vacuum.

14. The chamber of claim 10 wherein the lathe comprises a hollow lathe shaft mounted lengthwise adjacent the inside of the cylindrical walls, means for mounting the cutting head for movement along the outside of the lathe shaft, a lathe drive member in the lathe shaft for movement in the lathe shaft, the lathe drive member being magnetically coupled to the cutting head whereby the lathe drive member moves the cutting head along the inside of the cylindrical walls to cut the ice therefrom.

15. The chamber of claim 14 wherein the lathe further comprises hydraulic means attached to the lathe drive member for pressurizing the lathe shaft whereby changing the pressure moves the lathe drive member for moving the cutting member.

16. The chamber of claim 15 further comprising a heater attached to the hydraulic means for heating the hydraulic fluid to raise the temperature of the lathe shaft for melting ice that would form thereon.

17. The chamber of claim 16 further comprising tube means attached to the lathe drive member and to the hydraulic means, the tube means having perforations thereon, the hydraulic means circulating warm fluid from the heater to the lathe shaft at the lathe drive member to heat the lathe shaft to melt ice thereon.

18. The chamber of claim 14 wherein the lathe shaft has a low friction coating thereon for ease in removing ice forming thereon.

19. The chamber of claim 18 wherein the cutting head has at least one wiper contacting the lathe shaft for removing ice from the lathe shaft.

20. The chamber of claim 14 wherein the cutting head has a blade pivotally mounted thereon, stop means on the cutting head for holding the blade against the ice when the cutting head moves in one direction and whereby the blade can pivot when the cutting member moves in the opposite direction.

21. The chamber of claim 1 wherein the inside of the cylindrical wall is a condensing surface for condensing thereon sublimates from a product in the chamber, the weight of the condensate on the cylindrical wall acting against the pressure differential.

22. The chamber of claim 21 wherein the thickness of the cylindrical wall at the chosen maximum rate of rotation of the chamber without condensate formed thereon is insufficient to withstand collapse of the cylindrical wall, whereby the centrifugal force of the condensate prevents collapse of the cylindrical wall.

23. In a vacuum chamber having an airtight chamber, vacuum means for evacuating the chamber and condenser means for condensing condensables from the product in the chamber, the improvement comprising:

means associated with the condenser means for increasing the gravitational forces on the condenser means to increase the rate at which the condensables condense thereon.

24. A system for processing products at low temperatures and pressures including a vacuum chamber for provising reduced pressure for the products and means for decreasing the temperature within the chamber, the improvement comprising the provision of:

drive means for rotating the chamber at a sufficient velocity for centrifugal force of the rotating cylindrical wall to act against the force resulting from the pressure differential between the inside of the evacuated chamber and ambient pressure on the outside of the cylindrical wall to prevent the cylindrical wall from collapsing, the rotating chamber being mounted in a compartment, and means for directing cold air into the compartment against the outside of the rotating chamber to reduce the temperature within the chamber.

25. The system of claim 24 wherein the cooling means comprises a port, a heat exchanger in the port and refrigeration means connected to the heat exchanger for cooling the heat exchanger, air driving means in the port adjacent the heat exchanger for driving air over the heat exchanger to cool the air and for driving the cold air into the compartment and a return port from the compartment and connected to the port means for receiving air that has been warmed by the chamber and returning the air to the heat exchanger where it can be cooled and directed back into the compartment.

26. The system of claim 25 further comprising a baffle in the compartment between the port means and the return port for directing air in the compartment to the return port.

27. The system of claim 24 further comprising a non-rotating inner member mounted in the chamber, the inner member comprising a plurality of vertically spaced rooms upon which a product can be placed, opening means in the outside of the chamber for providing access to the rooms, the compartment having a plurality of floors aligned with the rooms whereby product can be moved into the chamber from the floors through the openings into the chamber.

28. A method of creating a vacuum within a chamber comprising the steps of:

evacuating the chamber and rotating the chamber along a longitudinal axis to balance the force acting from the outside of the chamber due to the pressure differential between ambient pressure on the inside of the chamber and the centrifugal force whereby the balancing of forces prevents the chamber from collapsing.

29. The method of claim 28 further comprising the steps of condensing the sublimate from the product on the inside of the chamber to remove the sublimate and to provide a ballast to the rotating chamber to act as an additional force outward on the chamber.

30. The method of claim 29 further comprising the step of removing a portion of the condensed material from the inside of the chamber to maintain the thickness of the condensate at a relatively constant depth.

31. The method of claim 29 further comprising the step of melting the condensate that is removed from the inside of the chamber and pumping the melted condensate under pressure to the outside of the chamber.

32. The method of claim 29 comprising controlling the speed of rotation of the chamber as a function of ballast thickness and the pressure in the chamber.

33. In a device for translating a moving member comprising a hollow shaft, a moving member mounted for movement along the outside of the hollow shaft, a drive member in the hollow shaft for movement in the hollow shaft, hydraulic means attached to the drive member for pressurizing the hollow shaft whereby changing the pressure moves the drive member, the hollow driving member being magnetically coupled to the moving member whereby the drive member moves the moving member and a heater attached to the hydraulic means for heating the hydraulic fluid to raise the temperature of the hollow shaft to melt any ice that would form on the hollow shaft.

34. The device of claim 33 further compromising tube means attached to the drive member and to the tube means having perforations therethrough, the hydraulic means circulating warm fluid from the heater to the lathe shaft at the lathe drive member to heat the lathe shaft to melt ice thereon.

* * * * *